(12) United States Patent
Rusch et al.

(10) Patent No.: US 9,574,615 B2
(45) Date of Patent: Feb. 21, 2017

(54) CENTRIFUGAL PENDULUM AND CLUTCH DISC HAVING THE LATTER

(71) Applicant: Schaeffler Technologies GmbH & Co. KG, Herzogenaurach (DE)

(72) Inventors: Alain Rusch, Kilstett (FR); Steffen Lehmann, Ettlingen (DE); Walter Hepperle, Offenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 89 days.

(21) Appl. No.: 14/200,627

(22) Filed: Mar. 7, 2014

(65) Prior Publication Data
US 2014/0182993 A1  Jul. 3, 2014

Related U.S. Application Data

(63) Continuation of application No. PCT/DE2012/000841, filed on Aug. 21, 2012.

(30) Foreign Application Priority Data

Sep. 9, 2011  (DE) ......................... 10 2011 082 389

(51) Int. Cl.
| | |
|---|---|
| *F16H 15/14* | (2006.01) |
| *F16D 3/12* | (2006.01) |
| *F16F 15/14* | (2006.01) |
| *F16D 13/38* | (2006.01) |
| *F16F 15/121* | (2006.01) |

(52) U.S. Cl.
CPC ................ *F16D 3/12* (2013.01); *F16D 13/38* (2013.01); *F16F 15/145* (2013.01); *F16F 15/1215* (2013.01); *Y10T 74/2128* (2015.01)

(58) Field of Classification Search
CPC ................ F16H 2045/6263; F16H 2045/0263; F16F 15/14; F16F 15/1202; F16D 3/14
See application file for complete search history.

(56) References Cited

U.S. PATENT DOCUMENTS

| 4,601,677 | A | * | 7/1986 | Takeuchi .................... 464/68.91 |
| 5,560,267 | A | * | 10/1996 | Todd et al. ...................... 74/604 |
| 5,988,343 | A | * | 11/1999 | Kleifges et al. ......... 192/213.12 |
| 6,068,098 | A | * | 5/2000 | Yamamoto ............ F16F 15/126 192/209 |
| 8,459,425 | B2 | | 6/2013 | Ruder et al. |

(Continued)

FOREIGN PATENT DOCUMENTS

| CN | 1955502 | 5/2007 |
| CN | 102149942 | 8/2011 |

(Continued)

*Primary Examiner* — Robert Hodge
*Assistant Examiner* — Ryan Dodd
(74) *Attorney, Agent, or Firm* — Volpe and Koenig, P.C.

(57) ABSTRACT

A centrifugal pendulum and a clutch disk with a pendulum flange provided thereon, rotational about an axis of rotation, and several pendulum weights distributed over the circumference and received on the pendulum flange in a pivotal fashion. In order to at least reduce noise development due to mass momentum of inertia acting here caused by the centrifugal pendulum, the pendulum flange is received on a rotational part, rotating on an axis of rotation, and a friction clutch is effectively arranged between the pendulum flange and said part.

9 Claims, 2 Drawing Sheets

(56) References Cited

U.S. PATENT DOCUMENTS

2011/0099992 A1* 5/2011 Magerkurth et al. ........... 60/435
2011/0162480 A1    7/2011 Ruder et al.
2011/0192692 A1    8/2011 Werner et al.

FOREIGN PATENT DOCUMENTS

| DE | 102006028552 | * | 3/2007 | ............. F16D 13/64 |
| DE | 102009042837 | | 4/2010 | |
| DE | 102010034812 | | 3/2011 | |
| EP | 1780434 | | 5/2007 | |
| WO | 2010028620 | | 3/2010 | |

* cited by examiner

CENTRIFUGAL PENDULUM AND CLUTCH DISC HAVING THE LATTER

INCORPORATION BY REFERENCE

The following documents are incorporated herein by reference as if fully set forth: International Application No. PCT/DE2012/000841, filed Aug. 21, 2012; and German Patent Application No. 102011082389.1, filed Sep. 9, 2011.

BACKGROUND

The invention relates to a centrifugal pendulum and a clutch disk, comprising a pendulum flange, rotational about an axis of rotation, and several pendulum weights pivotally received on the pendulum flange and distributed over the circumference.

In order to reduce torsional vibrations, for example of an internal combustion engine with successive ignitions, caused by the angle of rotation of a crankshaft, torsional vibration dampers and/or torsional vibration absorbers are used, which are optimized for the excitation frequency and temporarily absorb the torque peaks of the torsional vibrations and release them during the torque minima of the torsional vibrations. Here, speed-adjusted torsional vibration absorbers in the form of centrifugal pendulums have proven particularly advantageous, used separately or in a combination with additional torsional vibration dampers. Here, several pivotal pendulum weights are arranged on a part of the torsional vibration system, rotating about an axis of rotation, along a pivotal angle in reference to the rotating part, for example the pendulum flange, distributed over the circumference. These pendulum weights perform vibrations on predetermined paths in the field of centrifugal acceleration when they are excited by cyclic irregularities, such as torsional vibrations. Due to these vibrations, energy is removed from the exciter vibration at the appropriate time and resupplied such that a calming effect is achieved for the excitation frequencies. Due to the fact that both the resonance frequency of the centrifugal pendulum vibration and the excitation frequency are proportional in reference to the speed here the damping effect of a centrifugal pendulum can be yielded over the entire range of frequencies, thus adapted to the speed.

Such centrifugal pendulums are known for example from DE 10 2010 034 812 A1, and can be used in a combination with a torsional vibration damper. For example, a centrifugal pendulum may be located in a clutch disk with or without a torsional vibration damper, with the pendulum flange of the centrifugal pendulum being fastened torque-proof on the hub of the clutch disk. The clutch disk with the torsional vibration damper can here essentially have one or more damper stages switched serially. A first damper stage of a multi-stage torsional vibration damper shows little stiffness and low friction, which are influential at low torque of a drive train, for example at driving conditions such as stop-and-go, idling, or the like. A second damper stage may be activated when a maximum angle of rotation of the first damper stage has been exceeded and serves for damping higher torque, such as during acceleration of the motor vehicle via an appropriate drive train. For this purpose the respective damper stage shows a more steeply inclined characteristic and higher friction.

The centrifugal pendulum is used on such a clutch disk to increase the mass moment of inertia of the transmission input shaft, for example, in case of strongly changing momentums and low speeds, the damping capacity of the first damper stage, for example when the internal combustion engine is shut down without any gear being engaged and when the friction clutch is engaged. This way, the transmission input shaft may be subjected to high accelerations with corresponding noise development.

SUMMARY

The objective of the invention therefore is to provide a centrifugal pendulum, particularly in a clutch disk and a clutch disk with a centrifugal pendulum, which allows at least a reduction of noises during the change of momentums.

The objective is attained in a centrifugal pendulum with a pendulum flange rotational about an axis of rotation and comprising several pendulum weights, distributed over the circumference and received pivotally on said pendulum flange, with the pendulum flange in turn being received on a part, rotational about the axis of rotation, and a friction clutch being arranged acting between the pendulum flange and the part. By adjusting the friction moment of the friction clutch the mass moment of inertia of the centrifugal pendulum can be switched off in a targeted fashion, so that for example during load changes and the like an increased mass moment of inertia of the centrifugal pendulum with noises generated thereby, such as impact sounds and the like, cannot become negatively noticed. Furthermore, the centrifugal pendulum itself can be protected from damage and noise generation when it is disconnected from the rotating shaft via the pre-set friction moment of the friction clutch.

It has proven particularly advantageous for a centrifugal pendulum arranged on the hub of a clutch disk to be provided with a friction clutch towards said hub. When the friction clutch is disengaged the weight of the clutch disk and thus the centrifugal pendulum is allocated exclusively to the transmission input shaft via the hub geared thereto, so that rapid changes of the momentum may affect the gears of the transmission, for example, and lead to noise development in said transmission. Particularly when the clutch disk comprises a damper stage, embodied as an idling damper, it can be protected from impact even at low momentums, and remain functional here by allowing the friction clutch to disengage the centrifugal pendulum.

The friction clutch is advantageously formed by a friction device, pre-stressed via an energy storage, for example one or more springs, such as flat springs, with preferably axially or conically embodied friction areas being provided at the pendulum flange and the part, which form a predetermined friction moment of the friction clutch under the axial pre-stressing of the energy storage.

The objective is further attained in a clutch disk with an input part carrying a friction coating and an output part embodied as a hub as well as at least one damper stage arranged between the input part and the output part and a centrifugal pendulum arranged axially distanced from at least one damper stage with a pendulum flange centered on the hub and several pendulum weights, received pivotally on the pendulum flange and distributed over the circumference, with a friction clutch being arranged between the pendulum flange and the hub. Preferably the clutch disk is embodied with two damper stages, one idling damper with a low damping moment and a primary damper with a moment (equivalent to the one) to be transmitted via the clutch disk under load. The centrifugal pendulum is here switched parallel with regards to its effect to the torsional vibration damper, formed from the idling damper and the primary damper, and is switched off when changes of momentum occur which exceed the friction moment of the friction clutch, for example during acceleration. The friction clutch may be provided with and/or overlapped by a freewheel, so that the disengagement of the centrifugal pendulum occurs only in one torque direction.

In one preferred embodiment of the clutch disk with a centrifugal pendulum, which can be disengaged, friction areas are arranged, forming a frictional engagement at the hub and at the pendulum flange. Here, in the sense of a cost-effective embodiment of the hub, a bearing comprising the friction area is embodied in one piece with the hub, made for example by way of sintering, warm deformation, machining, or the like.

The pre-stressing of the friction areas between the hub and the pendulum flange occurs via an energy storage, which is geared axially between the hub and the pendulum flange. Preferably a bearing is provided for the axial support of the energy storage, integrated in one piece at the hub, with preferably the pendulum flange first being fastened and centered on the hub towards a stop such as a bearing comprising the friction surface, and then the energy storage, for example a flat spring is applied and centered, and subsequently, for example by way of caulking, tumbling, or the like, the bearing is formed, which may be embodied annularly or assembled from support elements arranged distributed over the circumference, with here the pre-stressing of the pendulum flange being adjusted in reference to the hub.

In an advantageous fashion, the energy storage, preferably formed from a flat spring, is suspended in a torque-proof fashion at the pendulum flange and forms another frictional area with an activated friction clutch in reference to the bearing embodied advantageously in an annular fashion.

BRIEF DESCRIPTION OF THE DRAWINGS

The invention is explained in greater detail based on the exemplary embodiment shown in FIGS. 1 and 2. Shown are.

DETAILED DESCRIPTION OF THE PREFERRED EMBODIMENTS

Figure 1:
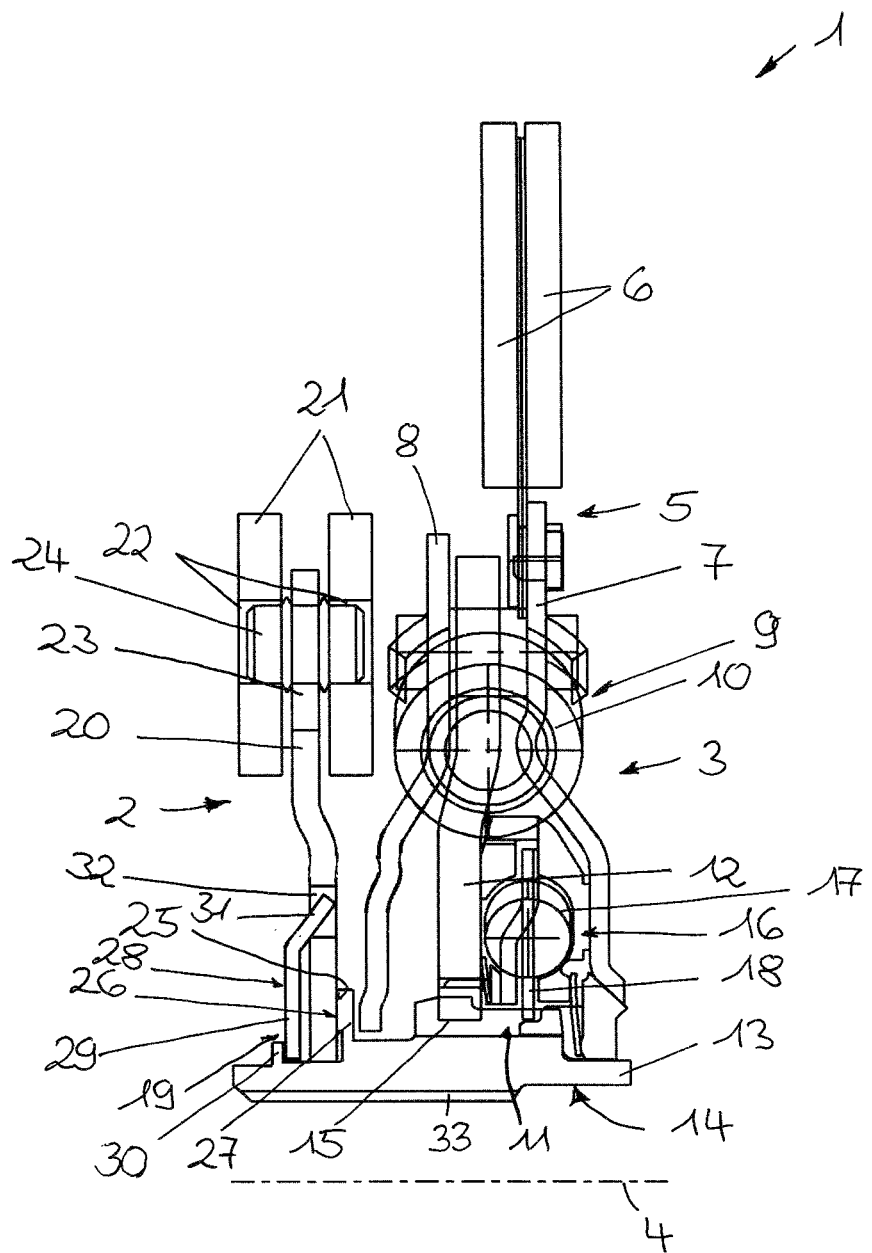
FIG. 1 a cross-section detail of a clutch disk with a centrifugal pendulum, which can be disengaged by a friction clutch, and FIG. 2 a diagram of the principle of the clutch disk of FIG. 1 with a two-stage torsion vibration damper and a centrifugal pendulum switched parallel thereto.

FIG. 1 shows the upper part of the clutch disk 1, arranged about the rotary axis 4, with the centrifugal pendulum 2 and the rotational vibration damper 3. The input part 5 of the clutch disk 1 is formed from the disk part 7, supporting the friction coatings 6 and impinging with the disk part 8 the energy storage 10 of the damper stage 9 of the primary damper, the output part 11 is formed by the hub 13. The flange 12 is geared via the teeth 15 with torsional play to the part 14 embodied as a hub 13, with the second damper stage 16 of the idling damper, its energy storage 17 between the flange 12 and the cam 18 geared directly to the hub 13 being stressed via its rotation angle. The energy storage units 10 are stressed between the input part 5 and the cam 18.

The centrifugal pendulum 2 is received on the part 14, such as the hub 13, rotational via the friction clutch 19, upon overcoming the friction moment provided by the friction clutch 19. For this purpose the pendulum flange 20, at which at both sides, distributed over the circumference, the pendulum weights 21 are accepted, pivotal via the moving rollers 24 in the sections 22, 23 of the pendulum flange 20 and the pendulum weights 21, via the friction surface 25 forming a frictional engagement with the friction surface 26 of the annular collar 27 embodied in one piece with the hub 13. The pre-stressing is performed by the energy storage unit 28, embodied as a flat spring 29, which is supported at the support collar 30 provided at the hub 13 and engages the recesses 32 via the fingers 31 and thus is connected to the pendulum flange 20 in a torque-proof fashion and glides along the support collar 30 when the friction moment of the friction clutch 19 has been overcome.

The recess of the pendulum flange can be a through hole that extends axially through the pendulum flange.

The centrifugal pendulum 2 is switched parallel in reference to the torsional vibration damper 3 and compensates vibrations according to the rotation when the friction clutch 19 is not active. When the friction clutch is disengaged, the mass moment of inertia of the centrifugal pendulum 2 is coupled to the transmission input shaft connected via the internal gear 33 to the hub 13 in a torque-proof fashion. In order to uphold the effectiveness of the second damping stage 16 of the torsional vibration damper 3, on the one hand, and to interrupt on the other hand any noise induced in the transmission by the mass moment of inertia of the centrifugal pendulum 2, said centrifugal pendulum 2 is engaged via the friction clutch 19 when the momentum capacity of the damping stage 16 exceeds the mass moments of inertia.

Figure 2:
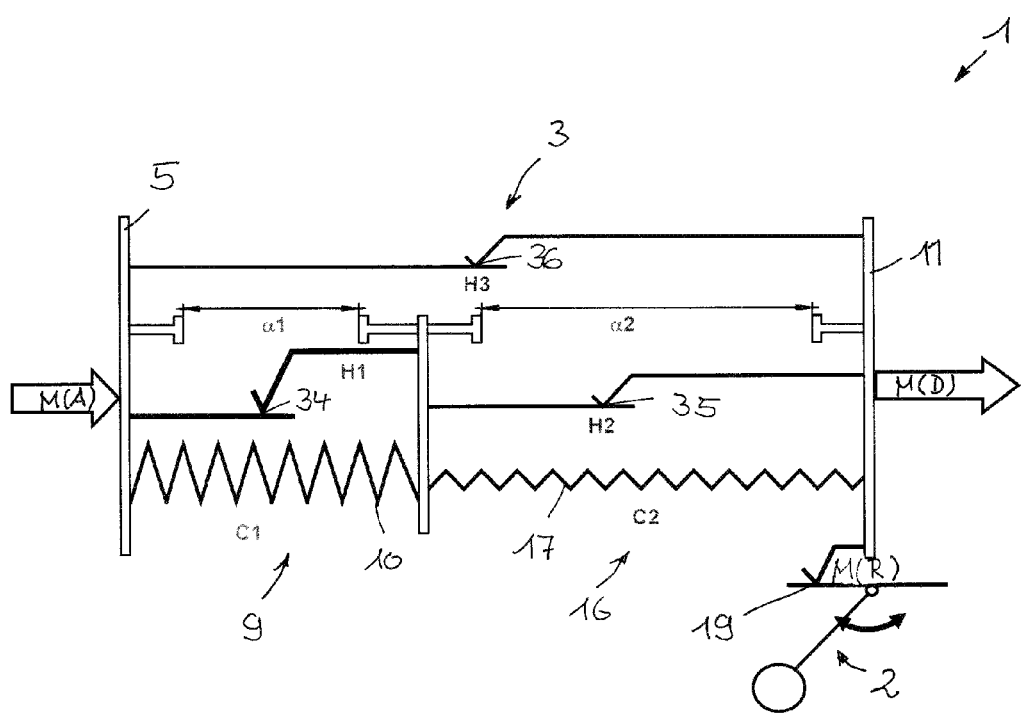

FIG. 2 shows in a schematic illustration the circuit of the clutch disk 1 with at the driving side the tensile moment M(A), introduced for example by an internal combustion engine showing torsional vibrations upon the input part 5, and the moment M(D) guided out, damping the clutch disk 1 at the output part 11. The rotational vibration dampers 3 and parallel thereto, via the hub 13 (FIG. 1) the centrifugal pendulum 2, which can be disengaged via the friction clutch 19, act between the input part 5 and the output part 11. The torsional vibration damper 3 includes the damper stages 9, 16 with the energy storage units 10, 17 comprising the spring capacities C1, C2 and the compression angles α1, α2, as well as the friction devices 34, 35 with the friction hysteresis H1, H2. The friction device 36 with the friction hysteresis H3 is switched over the entire angle of distortion between the input part 5 and the hub 13. Due to the higher stiffness of the energy storage units 10, at low moments, first the energy storage units 17 of the damper stage 16 are active. Upon an acute change of moments the friction moment M(R) of the friction clutch 19 is exceeded and the centrifugal pendulum 2 is disengaged.

LIST OF REFERENCE CHARACTERS

1 Clutch disk
2 Centrifugal pendulum
3 Torsional vibration damper
4 Axis of rotation
5 Input part
6 Friction coating
7 Disk part
8 Disk part
9 Damper stage
10 Energy storage
11 Output part
12 Flange
13 Hub
14 Part
15 Gearing
16 Damper stage 17 Energy storage
18 Cam
19 Friction clutch
20 Pendulum flange
21 Pendulum weight
22 Recess
23 Recess
24 Roller
25 Friction area
26 Friction area
27 Annular collar
28 Energy storage unit
29 Flat spring
30 Bearing
31 Fingers
32 Recess
33 Internal gearing
34 Friction device
35 Friction device
36 Friction device
C1 Spring capacity
C2 Spring capacity
H1 Friction hysteresis
H2 Friction hysteresis
H3 Friction hysteresis
M(A) Tensile moment
M(D) Moment
M(R) Friction moment
α1 Compression angle
α2 Compression angle

The invention claimed is:

1. A centrifugal pendulum, comprising a pendulum flange, rotational about an axis of rotation, with several pendulum weights, distributed over a circumference thereof and received pivotally on the pendulum flange, the pendulum flange received on an output hub, rotational about an axis of rotation, and a friction clutch is arranged directly between the pendulum flange and the output hub, the friction clutch includes a flat spring having a first end engaged directly against the output hub and a second end engaging a recess of the pendulum flange, the recess of the pendulum flange is a through hole that extends axially through the pendulum flange.

2. The centrifugal pendulum of claim 1, wherein the recess is spaced radially outwardly from the output hub.

3. The centrifugal pendulum of claim 1, wherein the flat spring includes a substantially radially extending portion including the first end, and a partially axially extending portion including the second end, wherein the substantially radially extending portion is positioned outside of the recess and the partially axially extending portion is at least partially located inside the recess.

4. A clutch disk comprising an input part carrying friction coatings and an output hub as well as at least one damper arranged between the input part and the output hub, and a centrifugal pendulum arranged axially distanced from the at least one damper, with a pendulum flange centered on the output hub and several pendulum weights pivotally located on the pendulum flange, distributed over a circumference thereof, and a friction clutch arranged directly between the pendulum flange and the output hub, the friction clutch includes a flat spring having a first end engaged directly against the output hub and a second end engaging a recess of the pendulum flange, the recess of the pendulum flange is a through hole that extends axially through the pendulum flange.

5. The clutch disk according to claim 4, wherein the friction clutch includes friction surfaces arranged on the output hub and the pendulum flange, forming a frictional engagement.

6. The clutch disk according to claim 5, wherein an annular collar with a friction area is integrated in one piece at the output hub.

7. The clutch disk according to claim 6, wherein the pendulum flange is pre-stressed against the output hub opposite an effect of the flat spring.

8. The clutch disk according to claim 7, wherein the flat spring rests on a bearing integrated in one piece with the output hub.

9. The clutch disk according to claim 8, wherein the flat spring is suspended on the pendulum flange in a torque-proof fashion.

* * * * *